(12) United States Patent
Oh

(10) Patent No.: US 6,944,241 B1
(45) Date of Patent: Sep. 13, 2005

(54) APPARATUS AND METHOD OF ELIMINATING VESTIGIAL SIDEBAND PILOT TONE IN VESTIGIAL SIDEBAND/QUADRATURE AMPLITUDE MODULATION SYSTEM

(75) Inventor: Ji-sung Oh, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 529 days.

(21) Appl. No.: 09/644,540

(22) Filed: Aug. 24, 2000

(30) Foreign Application Priority Data

Aug. 24, 1999 (KR) .................................. 1999-35275

(51) Int. Cl.[7] .............................................. H03D 1/24
(52) U.S. Cl. ...................................... 375/321; 329/357
(58) Field of Search .................. 455/47, 109, 202–204; 375/316, 320, 229, 232, 235, 231, 270, 261, 277, 285, 298, 301, 321, 327, 326, 346, 324, 350, 365, 325, 344, 355, 343; 348/500, 513, 512, 521, 725, 726; 329/304, 306, 307, 357; 708/300, 323, 425

(56) References Cited

U.S. PATENT DOCUMENTS

| | | | | |
|---|---|---|---|---|
| 5,673,293 A | * | 9/1997 | Scarpa et al. ................ | 375/321 |
| 5,675,283 A | * | 10/1997 | Sgrignoli ..................... | 329/357 |
| 5,699,011 A | * | 12/1997 | Sgrignoli ..................... | 329/350 |
| 5,799,037 A | * | 8/1998 | Strolle et al. ................ | 375/233 |
| 6,067,329 A | * | 5/2000 | Kato et al. ................... | 375/321 |
| 6,133,964 A | * | 10/2000 | Han ............................. | 348/726 |
| 6,219,379 B1 | * | 4/2001 | Ghosh ......................... | 375/232 |
| 6,233,295 B1 | * | 5/2001 | Wang .......................... | 375/364 |
| 6,426,972 B1 | * | 7/2002 | Endres et al. ................ | 375/229 |
| 6,430,234 B1 | * | 8/2002 | Perlow ........................ | 375/321 |
| 6,493,409 B1 | * | 12/2002 | Lin et al. ..................... | 375/375 |
| 6,526,101 B1 | * | 2/2003 | Patel ........................... | 375/240.28 |

* cited by examiner

Primary Examiner—Tesfaldet Bocure
Assistant Examiner—Khanh Tran
(74) Attorney, Agent, or Firm—Sughrue Mion, PLLC

(57) ABSTRACT

An apparatus and method for eliminating a vestigial sideband (VSB) pilot tone in a vestigial sideband/quadrature amplitude modulation (VSB/QAM) receiving system, is provided. This apparatus eliminates a vestigial sideband (VSB) pilot tone in a vestigial sideband/quadrature amplitude modulation (VSB/QAM) shared receiving system including a VSB/QAM shared modulator for demodulating a received VSB signal and outputting I-axis VSB symbols and Q-axis VSB symbols. This apparatus includes an I-axis pilot tone eliminating unit for dividing the I-axis VSB symbols into a plurality of groups according to the sign of a pilot tone which remains in each symbol, obtaining the size of a pilot tone by calculating the average of VSB symbols in each group, and eliminating a pilot tone by adding the size of a pilot tone to or subtracting it from the I-axis VSB symbols, and a Q-axis pilot tone eliminating unit for dividing the Q-axis VSB symbols into a plurality of groups according to the sign of a pilot tone which remains in each symbol, obtaining the size of a pilot tone by calculating the average of VSB symbols in each group, and eliminating a pilot tone by adding the size of a pilot tone to or subtracting it from the Q-axis VSB symbols. In a VSB/QAM shared receiver, a VSB signal is demodulated in synchronization with the center frequency of a VSB signal, similar to a QAM signal, in the VSB/QAM shared receiver, so that a pilot tone signal component, which, in the prior art, remained in VSB symbol values even after demodulation, can be completely eliminated.

5 Claims, 3 Drawing Sheets

APPARATUS AND METHOD OF ELIMINATING VESTIGIAL SIDEBAND PILOT TONE IN VESTIGIAL SIDEBAND/ QUADRATURE AMPLITUDE MODULATION SYSTEM

BACKGROUND OF THE INVENTION

1. Field of the Invention

The present invention relates to a vestigial sideband/ quadrature amplitude modulation (VSB/QAM) shared receiver, and more particularly, to an apparatus and method for eliminating VSB pilot tone during VSB modulation in a VSB/QAM shared receiving system.

2. Description of the Related Art

Typical VSB/QAM shared receivers denote receivers designed so as to receive a VSB signal as well as a QAM signal. VSB/QAM shared receivers do not need to include a separate VSB receiver for VSB signals, so that hardware volume of receivers is reduced. Here, reception of VSB signals in a VSB/QAM shared receiver is accomplished using a technique of restoring the center frequency in a frequency band of a VSB signal to a direct current (DC), instead of using an existing method of restoring a pilot tone into a DC. Thus, a demodulated VSB signal is detected in a similar method to a method of detecting an offset QAM signal.

FIG. 1 is a block diagram of the typical VSB/QAM shared receiver described above. In the operation of the typical VSB/QAM shared receiver, referring to FIG. 1, a received signal is a signal which is received from an antenna, a cable, an optical fiber or the like, for example, and primarily demodulated to a center frequency. The received signal is applied to a first mixer 102 for mixing the received signal with a co-phase center carrier frequency, and a second mixer 110 for mixing the received signal with a center carrier frequency which has been 90° phase-shifted by a Hilbert filter 109. The center carrier frequency is supplied from a carrier oscillator 120 which is controlled in response to a carrier frequency control signal which is output by a decoder 118. The output of the first mixer 102 and the output of the second mixer 110 are applied to first and second analog-to-digital converters (ADC) 104 and 112, respectively, which operate in response to a control clock signal which is output by a clock oscillator 122.

Digital data streams from the first and second ADCs 104 and 112 are applied to first and second data slicers 108 and 116, respectively, via first and second BPFs 106 and 114, respectively, or via digital high-pass filters. The first and second data slicers 108 and 116 supply a binary pulse if a data value from received eye patterns exceeds a critical value for distinguishing between noise or other possible data values. The decoder 118 supplies a carrier restoration control signal to the carrier oscillator 120 to control a carrier frequency (fcs) from the carrier oscillator 120. Also, the decoder 118 supplies a clock restoration control signal to the clock oscillator 122 to control the clock oscillator 122 which operates the first and second ADCs 104 and 112 according to a data rate. The clock oscillator 122 can be a voltage controlled oscillator (VCO) which is controlled in response to a voltage clock frequency control signal-produced to maintain an appropriate frequency without misalignment of a received data clock, a symbol clock and all of other related data clocks.

As shown in FIG. 1, the conventional VSB/QAM shared receiver demodulates both a VSB signal and a QAM signal to reduce its hardware volume. However, in the conventional VSB/QAM shared receiver, the frequency of an oscillator which is oscillated within a demodulation unit is different from what is shown in FIG. 2 showing a typical VSB signal spectrum. That is, in the conventional VSB/QAM shared receiver, the frequency of an oscillator is oscillated to synchronize with the center frequency (fcs) of a VSB signal other than a pilot tone frequency (fp), and an offset-QAM signal is also demodulated together with the VSB signal.

A conventional VSB dedicated receiver demodulates a received VSB signal so that the frequency of the received VSB signal synchronizes with the same frequency as a pilot tone frequency. At this time, a pilot tone, which is shown as a DC component by demodulation, can be easily eliminated similar to removal of DC. However, when a VSB signal is demodulated in synchronization with the center frequency as described above, the conventional VSB/QAM shared receiver does not restore a pilot tone signal to a DC value. The pilot tone signal is converted into a discrete frequency tone having a frequency corresponding to a difference between the center frequency and a pilot tone frequency, and there remains a particular frequency tone within a demodulated VSB signal.

SUMMARY OF THE INVENTION

An objective of the present invention is to provide an apparatus and method for eliminating a pilot tone, by which a pilot tone is effectively removed from a vestigial sideband (VSB) symbol during demodulation of a VSB signal in a vestigial sideband/quadrature amplitude modulation (VSB/ QAM) shared receiving system.

The above objective is achieved by an apparatus for eliminating a vestigial sideband (VSB) pilot tone in a vestigial sideband/quadrature amplitude modulation (VSB/ QAM) shared receiving system including a VSB/QAM shared modulator for demodulating a received VSB signal and outputting I-axis VSB symbols and Q-axis VSB symbols, the apparatus comprising: an I-axis pilot tone eliminating unit for dividing the I-axis VSB symbols into a plurality of groups according to the sign of a pilot tone which remains in each symbol, obtaining the size of a pilot tone by calculating the average of VSB symbols in each group, and eliminating a pilot tone by adding the size of a pilot tone to or subtracting it from the I-axis VSB symbols; and a Q-axis pilot tone eliminating unit for dividing the Q-axis VSB symbols into a plurality of groups according to the sign of a pilot tone which remains in each symbol, obtaining the size of a pilot tone by calculating the average of VSB symbols in each group, and eliminating a pilot tone by adding the size of a pilot tone to or subtracting it from the Q-axis VSB symbols.

The above objective is also achieved by a method of eliminating a vestigial sideband (VSB) pilot tone in a vestigial sideband/quadrature amplitude modulation (VSB/ QAM) shared receiving system, the method comprising: (a) classifying the I-axis and Q-axis VSB symbols into a plurality of groups; (b) obtaining the DC value of a pilot tone which remains in each VSB symbol, by calculating the average of VSB symbols in each of the divided groups; and (c) eliminating a pilot tone by adding the calculated pilot tone DC value to or subtracting it from the I-axis and Q-axis VSB symbols.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

Hereinafter, a preferred embodiment of the present invention will be described in detail with reference to the attached drawings. Various specific details are shown in the following description and the attached drawings to provide a more general understanding of the present invention. It will be apparent to those skilled in the art that the present invention can be performed without these specific details. Commonly-known functions and configurations, that may make the subject matter of the present invention vague, will not be described.

Figure 1:
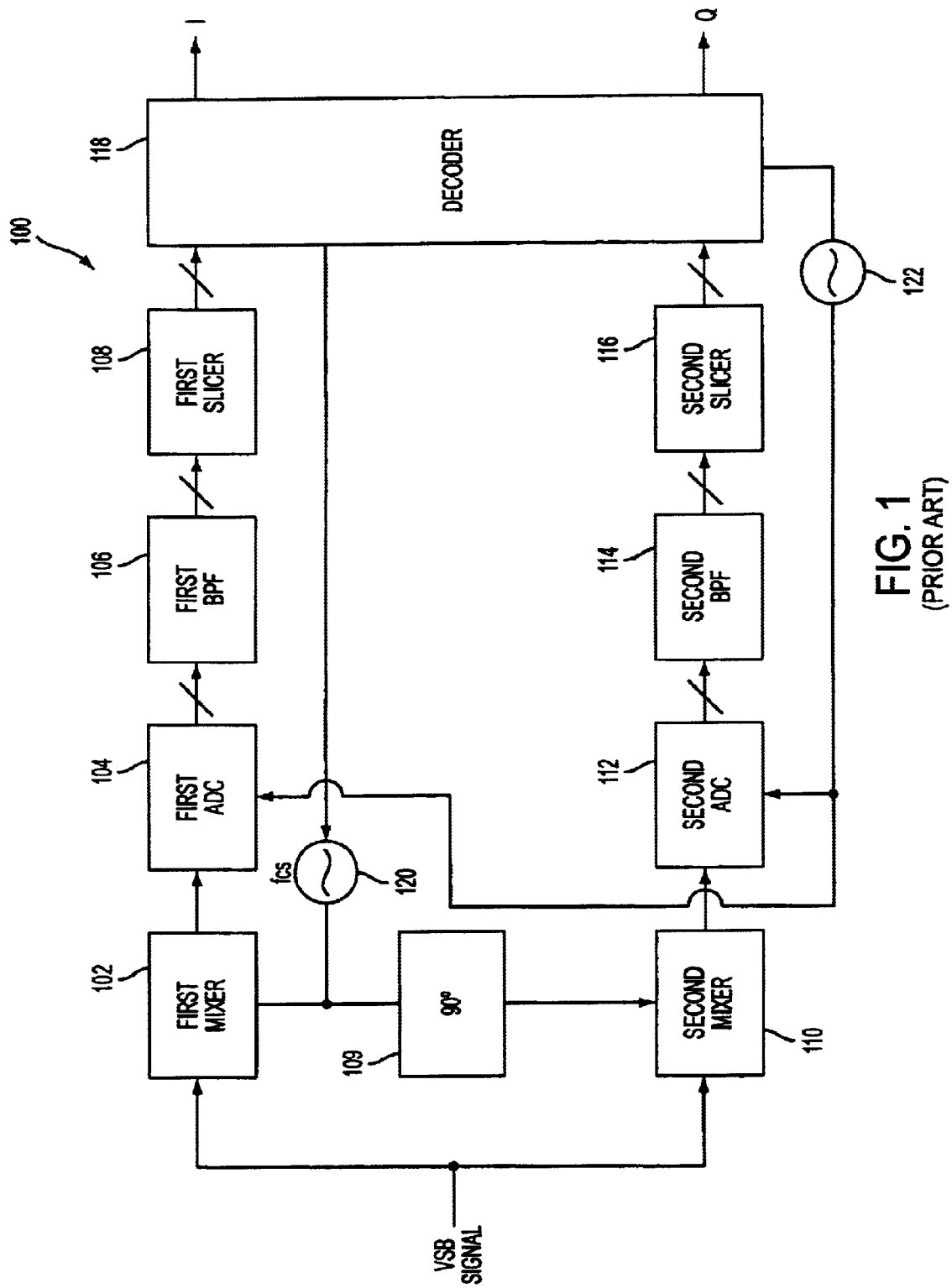
FIG. 1 is a block diagram of a typical VSB/QAM shared receiver.
Figure 2:
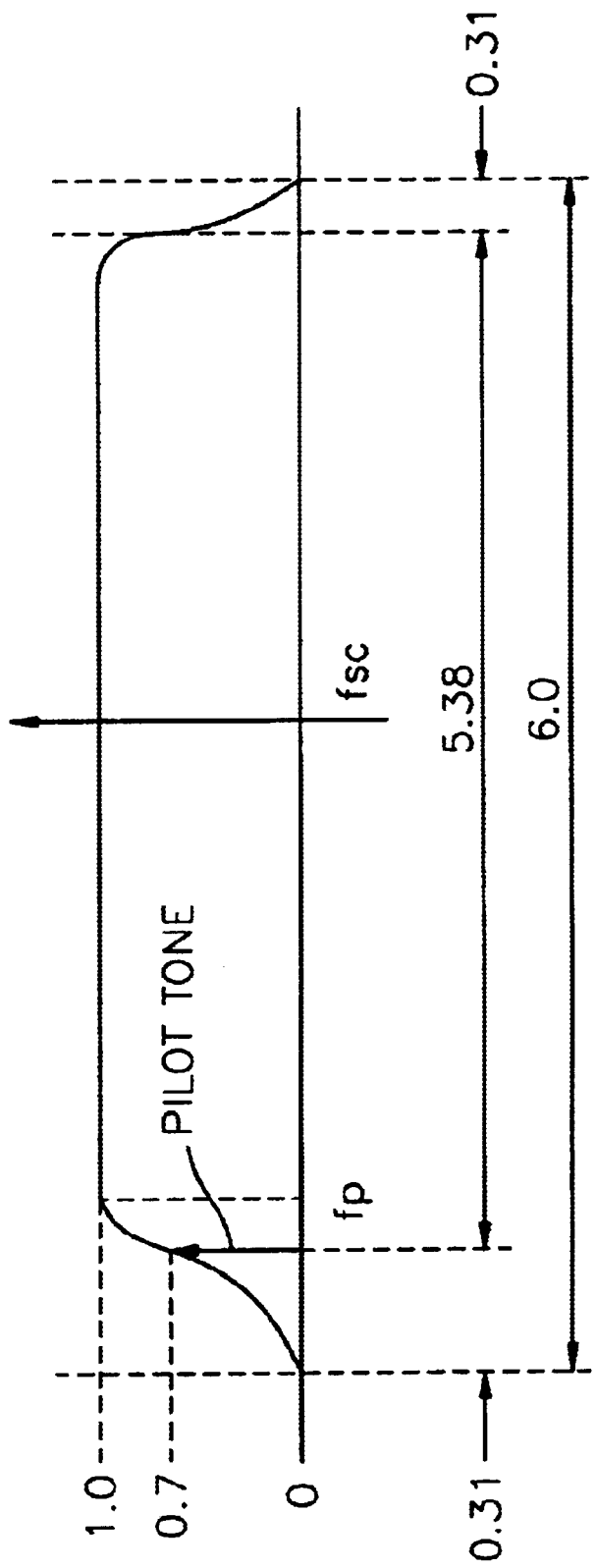
FIG. 2 is a spectrum diagram of a typical VSB signal.
Figure 3:
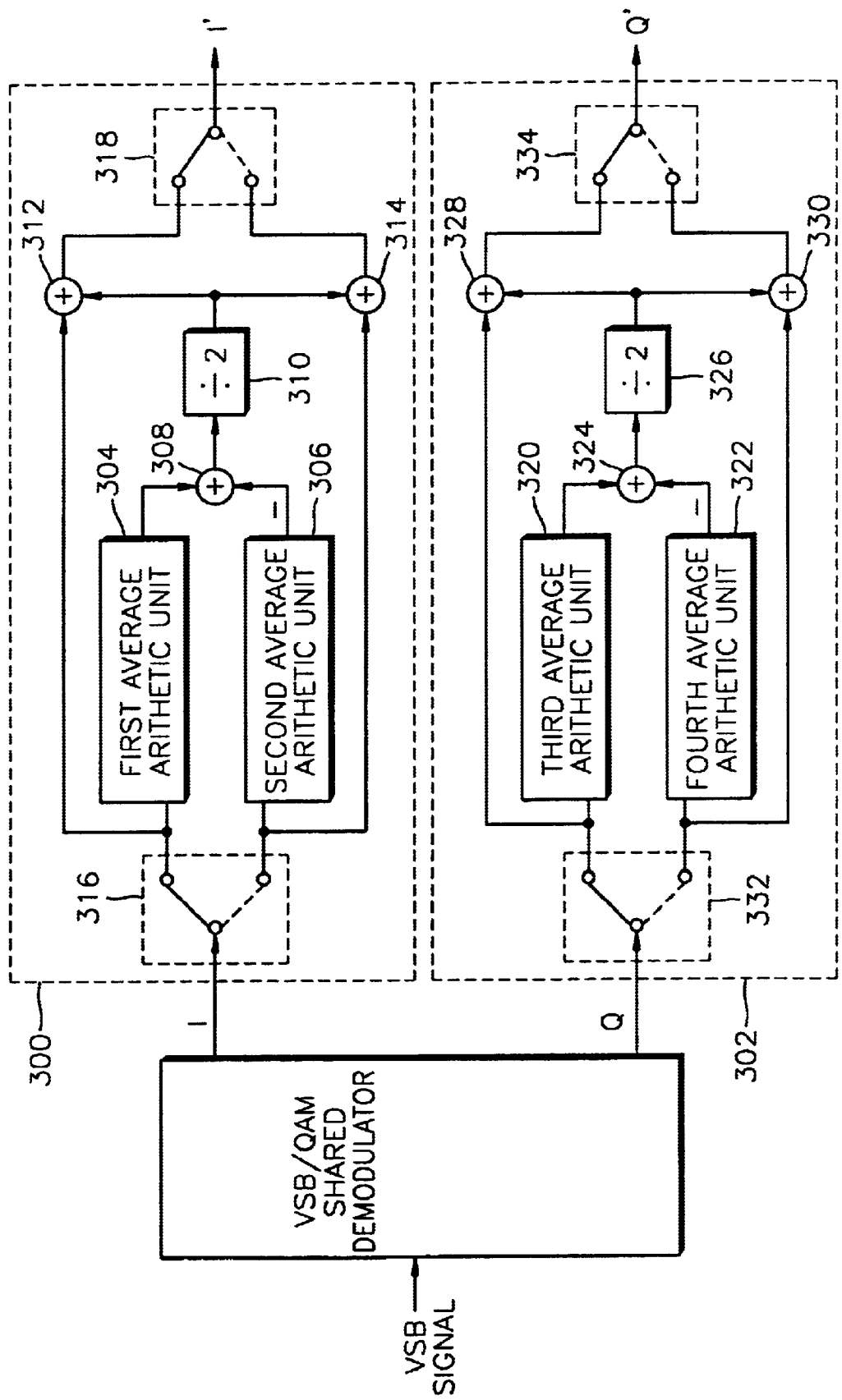
FIG. 3 is a block diagram of an apparatus for eliminating a VSB pilot tone in a VSB/QAM shared receiving system according to an embodiment of the present invention.

Referring to FIG. 3, when an I-axis signal of a vestigial sideband (VSB) by a symbol to be first transmitted is indicated as x(t), a Q-axis signal, which is the Hilbert transformed I-axis signal x(t), is indicated as x'.(t), and the direct current (DC) value of a pilot tone is indicated as d, a received VSB signal can be expressed as in Equation 1:

$$v(t)=[x(t)+d]\cos(2\pi fct)+x'(t)\sin(2\pi fct) \quad (1)$$

wherein fc denotes the frequency of a pilot tone signal.

Here, if a VSB signal transmitted as described above is demodulated in synchronization with the center frequency of a VSB signal, which is received in an ideal transmission channel, it is re-expressed on the I axis and Q axis as in Equation 2:

$$I=[x(t)+d]\cos[2\pi \cdot 1/(4T)\cdot t]-x'(t)\sin[2\pi \cdot 1/(4T)\cdot t]$$

$$Q=-[x(t)+d]\sin[2\pi \cdot 1/(4T)\cdot t]x'(t)\cos[2\pi \cdot 1/(4T)\cdot t] \quad (2)$$

If the I axis signal and the Q axis signaled are converted back into digital signals at a VSB symbol transmission rate (T), a demodulated VSB signal, which is the final output of a vestigial sideband/quadrature amplitude modulation (VSB/QAM) shared demodulator 100 of FIG. 3, is expressed on each of the I axis and the Q axis as in Equation 3:

$$I=[x(k)+d]\cos[(\pi/2)\cdot k)]-x'k \sin[(\pi/2)\cdot k]$$

$$Q=-[x(k)+d]\sin[(\pi/2)\cdot k)]+x'k \cos[(\pi/2)\cdot k] \quad (3)$$

Accordingly, a symbol detected on each of the I axis and Q axis according to k can be expressed as in Table 1.

TABLE 1

| k | 0 | 1 | 2 | 3 | 4 | 5 | ... |
|---|---|---|---|---|---|---|---|
| I axis | x0 + d |  | −x2 + d |  | x4 + d |  | ... |
| Q axis |  | −x1 − d |  | x3 + d |  | −x5 − d | ... |

That is, referring to Table 1, a transmission symbol string {x0, x1, x2, x3 ... } is alternately detected on the I axis and Q axis although its sign needs to be adjusted, and the sign of the DC value d of a pilot tone is changed according to an axis and a symbol number. Accordingly, when k is re-arranged on the basis of the sign of the DC value d, k can be divided into two groups of {k=0, 4, 8, ... } and {k=2, 6, 10, ... } on the case of the I axis, or divided into {k=1, 5, 9, ... } and {k=3, 7, 11, ... } in the case of the Q axis.

At this time, in an I-axis pilot tone eliminating unit 300, I-axis VSB symbols in a first group corresponding to the group {k=0, 4, 8, ... } are transmitted to a first average arithmetic unit 304 while I-axis VSB symbols in a second group corresponding to the group {k=2, 6, 10, ... } are transmitted to a second average arithmetic unit 306, by controlling the switching of a first switching unit 316. In a Q-axis pilot tone eliminating unit 302, Q-axis VSB symbols in a third group corresponding to the group {k=1, 5, 9, ... } are transmitted to a third average arithmetic unit 320 while Q-axis VSB symbols in a fourth group corresponding to the group {k=3, 7, 11, ... } are transmitted to a fourth average arithmetic unit 322, by controlling the switching of a third switching unit 332.

I-axis values demodulated by the VSB/QAM shared demodulator 100 are divided into groups and transmitted to the first and second average arithmetic units 304 and 306, and the average of the I-axis values is operated by them. Q-axis values demodulated by the VSB/QAM shared demodulator 100 are divided into groups and transmitted to the third and fourth average arithmetic units 320 and 322, and the average of the Q-axis values is operated by them. Here, it can be seen that the output values of the average arithmetic units 304, 306, 320 and 322 become the DC value d or −d of a pilot tone which remains in each VSB symbol, since the arithmetic average of the transmitted symbol is 0.

That is, first, the first average arithmetic unit 304 in the I-axis pilot tone eliminating unit 300 calculates the average of the VSB symbols of the first group, which are the outputs of the first switch unit 316, to output only the DC value d of a pilot tone which remains in each VSB symbol. Also, the second average arithmetic unit 306 calculates the average of the VSB symbols of the second group, which are the output of the first switch unit 316, to output only the DC value −d of a pilot tone which remains in each VSB symbol. Then, a first adder adds the absolute value of the DC value −d of the pilot tone output from the second average arithmetic unit 306 to the DC value of the pilot tone from the first average arithmetic unit 304. Thus, the output of the first adder 308 is 2d. A first divider 310 connected to the output of the first adder 308 divides the output of the first adder 308 by 2 to output a DC value d of a pilot tone which remains a VSB symbol.

Next, a negative sign is added to the DC value d of a pilot tone, which is the output of the first divider 310, by the second adder 312. The second adder 312 adds the resultant DC value of a pilot tone to each of the VSB symbols in the first group, which are output via the first switching unit 316, while the third adder 314 adds the resultant DC value of a pilot tone to each of the VSB symbols in the second group, which are output via the first switching unit 316. Accordingly, each of the VSB symbols in the first group where the positive DC value of a pilot tone remains is added to the negative DC value of a pilot tone in the second adder 312, so that the pilot tone is eliminated. Also, each of the VSB symbols in the second group where the negative DC value of a pilot tone remains is added to the positive DC value of a pilot tone in the third adder 314, so that the pilot tone is eliminated.

Following this, the VSB symbols in each group, from which a pilot tone has been eliminated by each of the second and third adders 312 and 314, are alternatively output in an I-axis VSB symbol bitstream having no pilot tones via a second switch 318, as in Equation 4:

$$I'=x0, x2, x4, x6, x8, ... \quad (4)$$

Similar to the I-axis pilot tone signal eliminating unit 300, the third average arithmetic unit 320 in the Q-axis pilot tone signal eliminating unit 302 calculates the average of the VSB symbols of the third group, which are the outputs of the third switch unit 322, to output only the DC value d of a pilot tone which remains in each VSB symbol. Also, the fourth average arithmetic unit 322 calculates the average of the VSB symbols of the fourth group, which are the output of the third switch unit 332, to output only the DC value –d of the pilot tone which remains in each VSB symbol. Then, a fourth adder 324 adds the absolute value of the DC value –d of the pilot tone output from the fourth average arithmetic unit 322 to the DC value of the pilot tone from the third average arithmetic unit 320. Thus, the output of the fourth adder 324 is 2d. A second divider 326 connected to the rear of the fourth adder 324 divides the output of the fourth adder 324 by 2 to output a DC value d of the pilot tone which remains a VSB symbol.

Next, a negative sign is added to the DC value d of a pilot tone, which is the output of the second divider 326, by the fifth adder 328. The fifth adder 328 adds the resultant DC value of a pilot tone to each of the VSB symbols in the third group, which are output via the third switching unit 322, while the sixth adder 330 adds the resultant DC value of a pilot tone to each of the VSB symbols in the fourth group, which are output via the third switching unit 322. Accordingly, each of the VSB symbols in the third group where a positive pilot tone DC value remains is added to the negative DC value of a pilot tone in the fifth adder 328, so that the pilot tone is eliminated. Also, each of the VSB symbols in the fourth group where a negative pilot tone DC value remains is added to the positive DC value of a pilot tone in the sixth adder 330, so that the pilot tone is eliminated.

Following this, the VSB symbols in each group, from which a pilot tone has been eliminated by each of the fifth and sixth adders 328 and 330, are output in a Q-axis VSB symbol bitstream having no pilot tones via a third switch 334, as in Equation 5:

$$Q' = x1, x3, x5, x7, x9, \ldots \quad (5)$$

Therefore, a VSB signal is demodulated in synchronization with a VSB center frequency in the VSB/QAM shared receiver, so that a pilot tone signal component, which, in the prior art, remained in symbol values even after demodulation, can be completely eliminated.

As described above, the present invention has an advantage in that a VSB signal is demodulated in synchronization with the center frequency of a VSB signal, likewise for a QAM signal, in the VSB/QAM shared receiver, so that a pilot tone signal component, which, in the prior art, remained in VSB symbol values even after demodulation, can be completely eliminated.

What is claimed is:

1. An apparatus for eliminating a vestigial sideband (VSB) pilot tone in a vestigial sideband/quadrature amplitude modulation (VSB/QAM) shared receiving system including a VSB/QAM shared demodulator for demodulating a received VSB signal and outputting I-axis VSB symbols and Q-axis VSB symbols, the apparatus comprising:

an I-axis pilot tone eliminating unit for dividing the I-axis VSB symbols into a first plurality of groups according to the sign of an I-axis pilot tone which remains in each symbol, obtaining the value of the I-axis pilot tone by calculating the average of VSB symbols in each of the first plurality of groups, and eliminating the I-axis pilot tone by adding the value of the I-axis pilot tone to or subtracting the value of the I-axis pilot tone from the I-axis VSB symbols; and a Q-axis pilot tone eliminating unit for dividing the Q-axis VSB symbols into a second plurality of groups according to the sign of a Q-axis pilot tone which remains in each symbol, obtaining the value of the Q-axis pilot tone by calculating the average of VSB symbols in each of the second plurality of groups, and eliminating the Q-axis pilot tone by adding the value of the Q-axis pilot tone to or subtracting the value of the Q-axis pilot tone from the Q-axis VSB symbols.

2. The apparatus of claim 1, wherein the I-axis pilot tone eliminating unit comprises:

a first switch unit dividing the I-axis VSB symbols output by the VSB/QAM shared demodulator into two groups according to the sign of the I-axis pilot tone which remains in each of the I-axis VSB symbols;

first and second average arithmetic units for calculating the average of I-axis VSB symbols in each group divided by the first switch unit to extract the direct current (DC) value of the I-axis pilot tone which remains in the I-axis VSB symbols of each group;

a first adder for adding the DC value of a first pilot tone extracted by the first average arithmetic unit to the DC of a second pilot tone extracted by the second average arithmetic unit to output a third pilot tone;

a divider for dividing the DC value of the third pilot tone, which is output by the first adder, by 2 to output the DC value of the I-axis pilot tone which remains in a VSB symbol;

second and third adders for adding the DC value of the I-axis pilot tone, which is the output of the divider, to or subtracting the I-axis pilot tone from each of the I-axis symbols of each group classified by the first switch unit, to eliminate the I-axis pilot tone, and a second switch unit for outputting I-axis VSB symbols form which the I-axis pilot tone output by each of the second and third adders has been removed, in one bitstream.

3. The apparatus of claim 1, wherein the Q-axis pilot tone eliminating unit comprises:

a first switch unit for dividing the Q-axis VSB symbols output by the VSB/QAM shared demodulator into two groups according to the sign of the Q-axis pilot tone which remains in each of the Q-axis symbols;

first and second average arithmetic units for calculating the average of Q-axis VSB symbols in each group divided by the first switch unit to extract the direct current (DC) value of the Q-axis pilot tone which remains in the Q-axis VSB symbols of each group;

a first adder for adding the DC value of a first pilot tone extracted by the first average arithmetic unit to the DC value of a second pilot tone extracted by the second average arithmetic unit to output a third pilot tone;

a divider for dividing the DC value of the third pilot tone, which is output by the first adder, by 2 to output the DC value of the Q-axis pilot tone which remains in a VSB symbol;

second and third adders for adding the DC value of the Q-axis pilot tone, which is the output of the divider, to or subtracting the Q-axis pilot tone from each of the Q-axis VSB symbols of each group classified by the first switch unit, to eliminate the Q-axis pilot tone; and a second switch unit for outputting Q-axis VSB symbols from which the Q-axis pilot tone output by each of the second and third adders has been removed, in one bitstream.

4. A method of eliminating a vestigial sideband (VSB) pilot tone in a vestigial sideband/quadrature amplitude modulation (VSB/QAM) shared receiving system including a VSB/QAM shared demodulator for demodulating a received VSB signal and outputting I-axis VSB symbols and Q-axis VSB symbols, the method-comprising:

(a) classifying the I-axis and Q-axis VSB symbols into a plurality of groups;

(b) obtaining the DC value of a pilot tone which remains in each VSB symbol, by calculating the average of VSB symbols in each of the divided groups; and (c) eliminating a pilot tone by adding the calculated pilot tone DC value to or subtracting the calculated pilot tone DC value from the I-axis and Q-axis VSB symbols.

5. The method of claim 4, wherein in the step (a), the I-axis VSB symbols and the Q-axis VSB symbols demodulated by the VSB/QAM shared demodulator are each classified in two groups according to the sign of the pilot tone which remains in the VSB symbols.

* * * * *